United States Patent

Donn et al.

[11] Patent Number: 4,610,645
[45] Date of Patent: Sep. 9, 1986

[54] BELT STRETCHER UNIT DESIGNED FOR ASSEMBLY ON A FLEXIBLE DRIVE PARTICULARLY ON A MOTOR VEHICLE

[75] Inventors: Vittorio Donn; Paolo Bertetti, both of Turin, Italy

[73] Assignee: RIV-SKF Officine di Villar Perosa S.p.A., Turin, Italy

[21] Appl. No.: 709,520

[22] Filed: Mar. 8, 1985

[30] Foreign Application Priority Data

Mar. 9, 1984 [IT]   Italy .............................. 53082/84[U]

[51] Int. Cl.⁴ .............................................. F16H 7/10
[52] U.S. Cl. ...................................... 474/112; 474/199
[58] Field of Search ................. 474/112, 101, 198, 199

[56] References Cited

U.S. PATENT DOCUMENTS

| 1,171,347 | 2/1916 | Morse | 474/112 |
| 1,426,173 | 8/1922 | Schmid | 474/112 |
| 4,222,280 | 9/1980 | Stewart | 474/112 |
| 4,516,962 | 5/1985 | Brandenstein et al. | 474/112 |

FOREIGN PATENT DOCUMENTS

| 2043548 | 6/1971 | Fed. Rep. of Germany | 474/112 |
| 1101223 | 10/1955 | France | 474/112 |
| 2086000 | 5/1982 | United Kingdom | 474/112 |

Primary Examiner—Stephen J. Novosad
Assistant Examiner—Thuy M. Bui
Attorney, Agent, or Firm—Frost & Jacobs

[57] ABSTRACT

The belt stretcher unit is designed for assembly on a drive provided with a flexible member, e.g. for motor vehicles and consists of a pin, pivoting round a first axis, and of a pulley turning on the pin round a second axis eccentric with the first; the pulley is supported on the pin by at least one rolling bearing, and between the pin and the bearing, provision is made for an annular element made of elastic material.

9 Claims, 3 Drawing Figures

BELT STRETCHER UNIT DESIGNED FOR ASSEMBLY ON A FLEXIBLE DRIVE PARTICULARLY ON A MOTOR VEHICLE

BACKGROUND OF THE INVENTION

The present invention relates to a belt stretcher unit designed for assembly on a drive having a flexible member, e.g. a belt or chain, the unit being designed in particular for a motor vehicle, for maintaining drive and, at the same time, enabling tension adjustment of the flexible member.

Drives of the aforementioned type, designed in particular for transmitting drive from the drive shaft on an internal combustion engine to the accessories on the same, such as the alternator, water pump, power steering, air conditioner or the like, are known to employ a flexible member consisting of a continuous belt, usually made of rubber. The belt is wound partially round a number of pulleys, one connected to the drive shaft and the others to the aforementioned accessories for transmitting drive. The aforementioned drive also comprises a belt stretcher unit, the function of which is to ensure a given belt configuration and, at the same time, provide for tension adjustment on the belt.

The belt stretcher unit usually comprises a pin, pivoting round a first axis, and a pulley turning on the pin round a second axis eccentric with the first. The said pulley is supported on the pin by means of a rolling bearing or, quite simply, a ring of rolling bodies. The pin on the belt stretcher unit is usually secured to the engine block by a screw inserted in a hole on the pin the axis of which is the first axis already mentioned.

When the pin on such an arrangement is turned appropriately round the first axis, the said second axis round which the pulley turns is also shifted so as to set the drive belt to a given tension. When the tension slackens due to stretch on the belt during operation, initial tension on the belt may be reset by turning the pin round the first axis to a second position. Belt stretcher units of the aforementioned type involve a number of drawbacks.

First, resetting initial tension is frequently required, even after a fairly brief running period, owing to stretch during operation of the drive, caused in particular by creeping of the belt material.

Second, on drives of the aforementioned type, the belt is subjected to severe flexural vibration which, besides creating disturbing noise, may even displace the belt to the extent that it is released from its pulleys. These drawbacks are particularly noticeable on drives fitted with belts toothed on both faces or, as on currently-used engines, when rotation speed is particularly high. Furthermore, on drives between widely-spaced components supported on frames subject to severe thermal expansion during operation, the change in length produced by such thermal expansion may result in excessive load on the belt or a big reduction in shrinking tension.

SUMMARY OF THE INVENTION

The aim of the present invention is to provide a belt stretcher unit designed particularly for a motor vehicle comprising a flexible member having none of the aforementioned drawbacks, i.e. one providing for long-term operation without requiring tension adjustment, and, in particular, one enabling operation of the drive with very little vibration, no noise, no abnormal shift on the belt and no severe wear on either the belt or the surfaces of the pulleys it is wound round.

With this aim in view, the present invention relates to a belt stretcher unit of the aforementioned type essentially comprising a pin pivoting round a first axis, and a pulley turning on the pin round a second axis eccentric with a first. The pulley is supported on the pin by means of at least one rolling bearing, characterised by the fact that, between the pin and the bearing, provision is made for an annular element made of elastic material and entirely locked between the inner surface of the inner ring on the bearing, the outer surface of a section of the pin and a pair of axial shoulders.

BRIEF DESCRIPTION OF THE DRAWINGS

A non-limiting arrangement of the present invention will now be described with reference to the attached drawings in which.

DETAILED DESCRIPTION OF THE INVENTION

Figure 3:
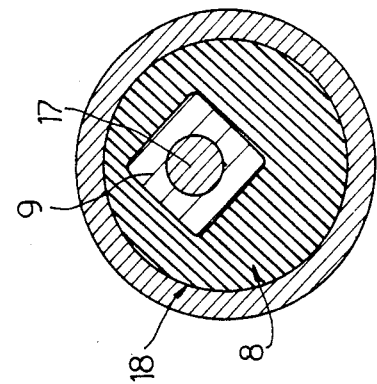
FIG. 3 shows a cross-section of the FIG. 2 belt stretcher unit along line III—III.

As shown clearly on the attached drawings, the belt stretcher unit according to the present invention essentially comprises a pin 1, pivoting round a first axis 2, and a pulley 3 turning on the pin round a second axis 4 eccentric with the first. The pulley is supported in relation to the pin by means of at least one rolling bearing 5 having an inner ring 6 and an outer ring 7.

The belt stretcher unit according to the present invention comprises an annular element 8 made of deformable elastic material and located between the inner ring 6 of rolling bearing 5 and an end section 9 of pin 1.

The annular element 8 is entirely locked between the surface 10 of inner ring 6 of bearing 5 and the outer surface 12 of section 9 on pin 1, as well as between a pair of shoulders 13, 14, the former formed on the said pin and the latter by a washer 15 or a flexible ring or any equivalent of the same.

Pin 1 is designed to fit on to the engine block 16 by means of screw 17 which fits through a hole on the pin and the axis of which coincides with the first axis 2 on the pin itself.

Figure 1:
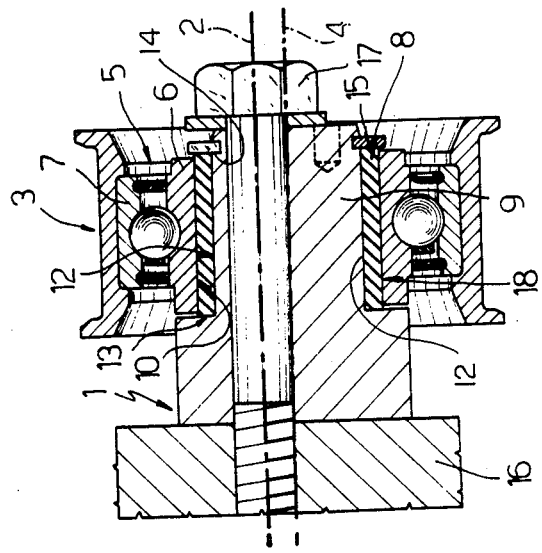
FIG. 1 shows a longitudinal cross-section of a first arrangement of belt stretcher unit according to the present invention.

In the first arrangement shown in FIG. 1, the axis of section 9 on pin 1, which coincides with axis 4, is eccentric in relation to first axis 2. Consequently, the thickness of elastic annular element 8 is essentially constant in any diametrical plane, so that element 8 may be formed simply in the shape of a cylindrical sleeve.

Figure 2:
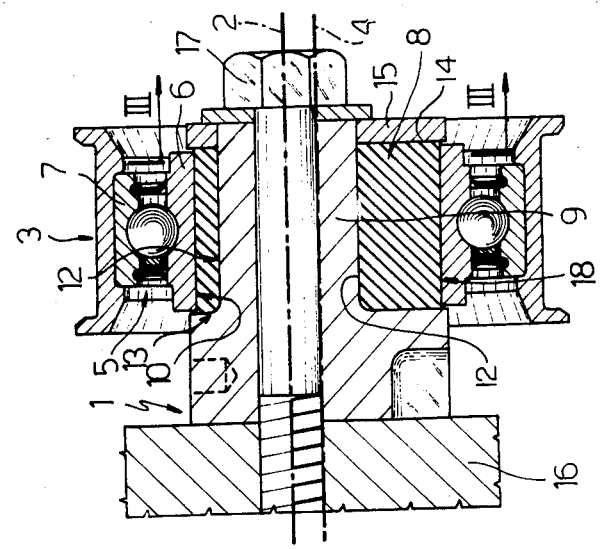
FIG. 2 shows a longitudinal cross-section of a second arrangement of the belt stretcher unit according to the present invention.

As shown clearly in the second arrangement in FIG. 2, the axis of end section 9 on pin 1 coincides with first axis 2 on the pin. Consequently, the thickness of elastic annular element 8 differs in different diametrical planes, so that its outer surface 18 is coaxial with the second axis 4 and acts as a support for inner ring 6 of bearing 5. In the FIG. 1 arrangement, end section 9 of pin 1 is cylindrical in section, whereas, in the FIG. 2 arrangement, it is square, as shown in FIG. 3.

Annular element 8 may be made of any deformable material, providing it is essentially elastic and highly hysteretic, so as to ensure efficient vibration damping. Such material is preferably rubber, possibly containing additives or fillers, or any other type of material having the same characteristics, e.g. elastomer, plastic, or the like.

Annular element 8 may conveniently be bonded to the inner surface 10 of inner ring 6, and to the outer surface 12 of section 9 on pin 1. For securing annular element 8, any other suitable method, e.g. bonding agent, may be employed, or the surfaces may be designed for enabling mechanical connection to the element itself. For this purpose, the surfaces may be knurled or grooved for enabling a splined connection of the element.

Annular element 8 may conveniently be locked on to end section 9 inside ring 6 on bearing 5 by means of pressure exerted by applying a suitable axial load on the element itself. For this purpose, end washer 15 (or a flexible ring performing the same function) is assembled so as to exert a preset axial load on the element 8, in such a manner as to generate essentially radial pressure when the element is inside the cavity defined by the outer surface of end section 9 and the inner surface of inner ring 6. For achieving the preload, the axial length of annular element 8 need simply be greater than that of the annular compartment into which it is inserted.

The belt stretcher unit according to the present invention operates as follows. The unit is secured, by means of screw 17, to frame 16 on the engine, in such a manner as to enable it to round first axis 2 for routine adjustment. The unit is designed for use on a belt drive (not shown) on which the belt is driven by a drive pulley, e.g. connected to the drive shaft on an internal combustion engine. In turn, the drive pulley drives a number of pulleys for controlling other devices usually consisting of the accessories on the engine, such as the alternator, water pump, power steering, air conditioner, or the like. The belt stretcher unit according to the present invention acts as a support for the belt which is received by the outer surface on pulley 3. Once the belt has been fitted on to the pulleys, including pulley 3, a preliminary adjustment may be made to the belt tension by first unscrewing screw 17 and then turning pin 1 round first axis 2, so as to shift second axis 4 by such an amount as to exert a given pull on the belt. At this point, the screw may be tightened and the drive operated normally. At this preliminary tension setting stage, the material from which annular element 8 is made is deformed to such an extent as to exert a flexible initial preload capable of maintaining the tension on the belt essentially unchanged, even after a long period of operation. The effect of creeping is well known, i.e. as the length of the belt increases, its initial tension slackens. The unit according to the present invention, however, provides for maintaining tension essentially constant over time, on account of the flexible preload exerted by annular element 8. The annular element 8 acts as an elastic member, such as a torsion bar or spiral spring, for maintaining the outer surface of pulley 3 constantly in contact with the belt, even when the length of the latter increases.

Furthermore, the unit according to the present invention has been found to essentially eliminate or greatly reduce the usual vibration on the belt at high speed, such an achievement being due to the damping effect of the highly hysteretic material of which annular element 8 is formed, and to the tension on the belt being maintained essentially constant.

The belt stretcher unit according to the present invention therefore provides for eliminating noticeable noise, abnormal displacement of the belt and severe wear both on the belt and the surface of the pulleys it is wound round.

Finally, the unit according to the present invention may be employed efficiently on drives where, due to the length or the running conditions, thermal expansion results in a shift of the axes on the drive pulleys. In this case, the elastic preload provided by annular element 8 obviously maintains constant tension on the belt even in the face of such dimensional changes.

To those skilled in the art it will be clear that changes can be made to the shape and arrangement of the parts on the belt stretcher unit according to the present invention without departing from the scope of the same. For example, annular element 8 may be formed differently from those described. The element may be provided with axial holes of any section for enabling greater deformability than that possible on a solid element, and the provide the element of a given preset rigidity.

Furthermore, though the arrangement described refers to a continuous belt, the deformable member of the drive may differ entirely and consist, for example, of a chain. The belt stretcher unit according to the present invention may obviously be employed on any type of machine or device.

We claim:

1. A belt stretcher unit designed for assembly on a drive having an endless flexible member, particularly for a motor vehicle, said unit comprising:
    a pin having an outer surface and designed to be mounted on said motor vehicle and designed to pivot around a first axis;
    a pulley being supported on said pin by means of at least one rolling bearing, said rolling bearing having an inner ring and an outer ring, said pulley mounted for rotation about a second axis eccentric with said first axis; and
    an elastic tubular element for maintaining said pulley in constant contact with said endless flexible member, said tubular element interposed between said pin and said rolling bearing; and
    a pair of axial shoulders positioned at each end of said elastic tubular element whereby said elastic tubular element is entirely locked between said inner ring of said rolling bearing, said outer surface of said pin, and said pair of axial shoulders.

2. The belt stretcher unit of claim 1, wherein said elastic tubular element is made of rubber.

3. The belt stretcher unit of claim 1, wherein said outer surface of said pin surrounded by said elastic tubular element is eccentric in relation to said first axis, and the thickness of said elastic tubular element is constant in any diametrical plane.

4. The belt stretcher unit of claim 1, wherein said outer surface of said pin surrounded by said elastic tubular element is coaxial with said first axis, and the thickness of said elastic tubular element differs in different diametrical planes.

5. The belt stretcher unit of claim 1, wherein said outer surface of said pin surrounded by said elastic tubular element is circular in cross-section.

6. The belt stretcher unit of claim 1, wherein said outer surface of said pin surrounded by said elastic tubular element is square in cross-section.

7. The belt stretcher unit of claim 1, wherein said inner ring is greater in length than said outer ring and equal in length to said elastic tubular element.

8. The belt stretcher unit of claim 1, wherein one of said pair of axial shoulders is a shoulder integral with said pin and the other of said pair of axial shoulders is a washer.

9. The belt stretcher unit of claim 1, wherein said elastic tubular element is bonded to said outer surface of said pin and to said inner ring.

* * * * *